United States Patent [19]

Cutler et al.

[11] 4,334,878

[45] Jun. 15, 1982

[54] INK JET INK COMPOSITION

[75] Inventors: Robert S. Cutler, Boulder; Michael T. Moore, Longmont, both of Colo.

[73] Assignee: International Business Machines Corporation, Armonk, N.Y.

[21] Appl. No.: 240,636

[22] Filed: Mar. 5, 1981

[51] Int. Cl.³ .............................................. C08L 25/08
[52] U.S. Cl. ........................................... 524/88; 8/558
[58] Field of Search ........................ 260/29.6 M; 8/558

[56] References Cited

U.S. PATENT DOCUMENTS 4,166,811 9/1979 Marr et al. ...................... 260/27 R

OTHER PUBLICATIONS

The Chemistry of Synthetic Dyes vol. V. by K. Venkataraman 1971, Hack's Chemical Dictionary 4th edition.

*Primary Examiner*—Joseph L. Schofer
*Assistant Examiner*—N. Sarofin
*Attorney, Agent, or Firm*—Francis A. Sirr

[57] ABSTRACT

An aqueous blue ink for use in ink jet printing, the ink being a mixture of a blue dye, a cyan dye, a styrene/acrylic binder, water and ammonia as a volatile solubilizing constituent.

8 Claims, No Drawings

INK JET INK COMPOSITION

Description

1. Technical Field

The present invention relates to the field of liquid marking ink compositions for use in ink jet printing devices.

2. Related Application

Copending and commonly assigned U.S. Pat. application Ser. No. 170,343, filed July 21, 1980, and entitled "Ink Jet Ink Composition," is incorporated herein by reference.

BACKGROUND OF THE INVENTION

The present invention comprises an improvement of the above-identified copending patent application.

Said copending application relates to a water based ink jet printing ink capable of producing high quality, high density images on a wide variety of substrates, while maintaining good archival properties.

Its formulation of water soluble dye, ammonia soluble acrylic binder, plasticizer, humectant, surfactant, biocide, chelating agent, and ammonium hydroxide produces an ink jet ink solution that is capable of being printed on a variety of substrates, both absorptive and nonabsorptive. This ink sets up in its own matrix, above the substrate, and is water-fast and wet smear resistant upon setting. At the same time, this ink produces high quality, high density images.

This copending application is based upon the discovery that acrylic binders that are soluble in a base, such as ammonium hydroxide, and insoluble in water, when formulated with compatible dyes and fugitive amines, yield waterfast images on a variety of nonabsorptive and absorptive substrates.

The invention requires a binder that is a copolymer of acrylic acid. The carboxylic acid group is an active group capable of being solubilized in the ink by a fugitive amine such as ammonia. The other binder constituent is a compound of a group such as styrene which helps insolubilize the copolymer of acrylic acid once the ink is printed and some of the amines are driven off. The resulting copolymer of styrene and acrylic acid is of a molecular weight about 10,000, and the styrene to acrylic acid proportion by weight is about 2 to 1. One such binder is Joncryl 67, a styrenated acrylic from S. C. Johnson Co. In general, the binder is used in amounts 3 to 15% by weight and preferably 8 to 11% by weight of the ink's composition.

A dye is used in that invention which is compatible with the binder. That is, the dye and binder, in certain ratios, are capable of forming waterfast, smear resistant images. Certain acid, basic, direct, solvent and polymer dyes are effective. The enhanced archival properties of the ink of that invention are thought to be a result of one or more of the following: entrapment of the dye in the insolubilized polymer film; dye-to-polymer noncomplexed form of attraction; and/or the dye is complexed to the polymer. Examples of compatible dyes are Direct Black 19 (examples III and IV), Acid Black 2, Solvent Red 124 (example I), Basic Red 12 (example II) and Acid Blue 90. The amount of colorant used is dependent on its purity and dye strength, and is limited by its solubility. In general, the dye or mixture of dyes is used in amounts ½ to 8% by weight.

In addition to dye and binder, the ink of that invention contains several selected materials necessary for a jet ink. The binder requires a plasticizer in order to obtain good print. Also, the ink must contain an anti-crusting agent so the ink will not have unreasonable start-up problems or stream misdirection. A polyethylene glycol such as Union Carbide Carbowax 200 brand serves both as a plasticizer and anti-crusting agent and can be used in the proportion 3 to 12% by weight, preferably 4 to 10% by weight. Carbowax is a water soluble lubricant, a known solvent for dyes, resins and proteins, and a known plasticizer for special printing inks.

As stated in that application, a surfactant can be used to adjust the surface tension so that smooth print is obtainable on a wide variety of substrates. The surface tension is adjusted to between about 30 to 40 dynes/cm. Triton GR5M, a water soluble surfactant from Rohm & Haas Co. which is dioctyl sodium sulfosuccinate, is one example of an acceptable surfactant.

Also, as stated therein, appropriate fungicide or antibacterial agent(s) may be used, and in general the type and amount will be dependent on the impurities in the ink and the dye solubility. Sodium omadine, a derivative of pyridinethione (sodium-2-pyridinethiol 1-oxide) having bactericide-fungicide properties is preferred, as is the organic chelating agent EDTA acid. NM2P (N-methyl-2-pyrrolidone) is used as a solubilizing agent.

THE INVENTION

The present invention comprises an improvement of the above-identified copending patent application. More specifically, the present invention provides a superior waterfast and lightfast blue ink jet ink, wherein the property of being both waterfast and lightfast is achieved by the synergistic effect provided by combining a first waterfast blue dye, which is binder compatible as defined by said copending application, with a second lightfast blue dye which is not binder compatible.

As used herein, the term lightfast is intended to mean that the printed ink loses no more than 20% of its reflectance density after 96 hours of exposure in a fadeometer. The term waterfast is intended to mean that the printed ink exhibits practically immeasurable bleed from a water spill test, with the test being conducted after the ink has dried, but less than one hour after printing.

We have found that it is particularly difficult to find a blue ink jet ink which exhibits both lightfastness and waterfastness. A blue ink jet ink formulated in accordance with said copending application does in fact exhibit superior waterfastness as one would expect from said related application. However, its lightfastness is not superior.

COMPARATIVE EXAMPLE I

A liquid blue ink was made following the teaching of said copending application and of the following wt. % formulation:

| | |
|---|---|
| Alizarine Cyanine Blue 6B Dye (Acid Blue 83) | 5.00% |
| Joncryl 67 | 10.00% |
| Carbowax 200 | 6.00% |
| EDTA 4Na | 0.20% |
| Na Omadine | 0.10% |
| Conc. NH$_4$OH | 2.50% |
| Water | 76.20% |

Alizarine Cyanine Blue 6B dye is a product of Keystone Aniline & Chemical Company.

This ink was used to produce ink jet printed characters which exhibited excellent waterfastness. Prints made by using this ink, however, lose 88% of their reflectance density when reflectance is measured after 96 hours of exposure in a fadeometer (1.5 watts/in$^2$ irradiance at 50% relative humidity).

COMPARATIVE EXAMPLE II

In an attempt to provide lightfastness, the following ink, expressed in wt. %, was formulated and characters were printed using ink jet techniques.

| | |
|---|---|
| Pyrazol Fast Turquoise FBL Dye (Direct Blue 86) | 5.00% |
| Joncryl 67 | 10.00% |
| Carbowax 200 | 6.00 |
| NM2P | 3.00% |
| Na Omadine | 0.10% |
| Conc. NH$_4$OH | 2.25% |
| Water | 73.65% |

Pyrazol Fast Turquoise FBL dye is a product of Sandoz, Inc., the Chemical & Colors Division.

These prints lost only 5% of their reflectance density in an identical fadeometer test. However, these prints exhibited poor waterfastness.

COMPARATIVE EXAMPLE III

This comparative example tested comparable to comparative example II, i.e. it exhibited good fade resistance, but poor waterfastness.

| | Wt. % |
|---|---|
| Pyrazol Fast Turquoise FBL Dye | 4.50% |
| Orasol Red 2B Tinting Dye | 0.50% |
| Joncryl 67 | 10.00% |
| Carbowax 200 | 6.00% |
| NM2P | 3.00% |
| Na Omadine | 0.10% |
| Conc. NH$_4$OH | 2.25% |
| Water | 73.65% |

Orasol Red 2B is the brand name of a dye which is furnished by Ciba-Geigy Company. The structure of this dye is proprietary.

We have surprisingly found that the addition of the waterfast dye of comparative example I to the lightfasst blue dye of comparative example II or III, which lightfast dye is not in itself compatible (i.e., not waterfast in the formulation of said copending application), for a reason not clear to us, provides a two-dye mixture which is compatible and the surprising result is a blue ink jet ink which is both waterfast and lightfast.

EXAMPLE IV

A first ink jet ink in accordance with the present invention was formulated as follows:

| | Wt. % |
|---|---|
| Alizarine Cyanine Blue 6B Dye | 2.50% |
| Pyrazol Fast Turquoise FBL Dye | 2.25% |
| Orasol Red 2B Dye | 0.25% |
| Joncryl 67 | 10.00% |
| Carbowax 200 | 6.00% |
| NM2P | 3.00% |
| Na Omadine | 0.10% |
| Conc. NH$_4$OH | 2.25% |

-continued

| | Wt. % |
|---|---|
| Water | 73.65% |

In this formulation, the tinting dye Orasol Red 2B is preferred, but not essential to achieving both lightfastness and waterfastness. When this ink is used to print by means of an ink jet device, the characters are of a high density blue, and surprisingly exhibit both acceptable lightfastness and acceptable waterfastness.

EXAMPLE V

A second ink jet ink was then formulated in accordance with the present invention, using highly pure cyan presscake dye. The result is the preferred example of the present invention,

| | Wt. % |
|---|---|
| Alizarine Cyanine Blue 6B Dye | 2.00% |
| Pyrazol Fast Turquoise FBL Presscake | 0.50% |
| Orasol Red 2B Dye | 0.25% |
| Joncryl 67 | 10.00% |
| Carbowax 200 | 6.00% |
| NM2P | 3.00% |
| EDTA 4Na | 0.20% |
| Na Omadine | 0.10% |
| Conc. NH$_4$OH | 2.25% |
| Water | 75.70% |

This ink was then used to print characters using ink jet techniques. The result was again a print which was both lightfast and waterfast.

Other formulations in accordance with examples IV and V were prepared, and characters were ink jet printed, in order to explore acceptable ranges of the dyes. As a result, Alizarine Cyanine Blue 6B was found to be useful in the wt. % range 1.75 to 2.5. From this, it is expected that other dyes which are structurally similar to Alizarine Cyanine Blue 6B, such as Alizarine Brilliant Cyanine Blue G (acid blue 90) would be acceptable.

The acceptable wt. % range for the dye Pyrazol Fast Turquoise FBL was found to be 2.25 to 3.0, whereas in presscake form it was found to be 0.5 to 1%. This dye in presscake form is more pure than the Pyrazol dye of example IV. Thus, the wt. % ranges are essentially equivalent. From this, it is expected that other lightfast, copper phthalocyanine water-soluble dyes would be acceptable alternatives.

The tinting dye Orasol Red 2B was used in the formulation of the present invention for the sole purpose of tinting the basically blue ink to a darker blue, and a wt. % of about 0.25 is suggested.

The method of making the above described inks can take a variety of forms known to those of skill in the art. Said copending application is an example. Specifically, the Joncryl 67 constituent was first dissolved in the ammonium hydroxide at room temperature, and the remaining constituents were then added to the solution. This solution was then stirred for a period of time, such as two hours, to dissolve all solids. The resulting ink was then filtered through a 0.2 micron filter.

All inks were then printed using ink jet techniques, on coated nonabsorbent and uncoated absorbent papers. The resulting print was then tested for waterfastness and lightfastness. The criterion used to determine acceptable waterfastness was that the print characters must exhibit no more than 0.05 absorbance units of bleed into a water spill one hour after printing. More specifically, absorbance units are measured by placing 10 milliliters of deionized water in contact with a solid-area-printed portion of a sheet. This amount of water is confined to the area of a one inch diameter cylinder. After 15 seconds, the water is withdrawn and the water's visible absorbance spectrum is measured by the use of a spectrophotometer. The above-mentioned units of absorbance are measured at the peak absorbance of the ink dye which was used to form the sheet's solid-area-printed portion. The criterion used to determine acceptable lightfastness was that the print characters must not lose more than 20% in reflectance density after 96 hours of exposure in a fadeometer when subjected to 1.5 watts per square inch irradiance at 50% relative humidity.

Using this criterion, comparative examples I-III, and examples IV and V of this invention, tested as follows:

|     | Bleed | Fade |
| --- | --- | --- |
| I   | 0.01 | 88 |
| II  | 0.22 | 5 |
| III | 0.18 | 5 |
| IV  | 0.03 | 17 |
| V   | 0.01 | 19 |

While this invention has been described with reference to two preferred embodiments thereof, it will be understood by those skilled in the art that various changes in formulation may be made in the ink jet ink of this invention without departing from the spirit and scope of this invention.

What is claimed is:

1. A blue ink jet ink composition which is both waterfast and lightfast, and which consists essentially of an aqueous solution of a copolymer of styrene and acrylic acid of a molecular weight about 10,000, and in about a 2 to 1 ratio;
   a volatile base capable of solubilizing said copolymer;
   a blue dye in a wt. % range 1.75 to 2.5, said dye being compatible with said copolymer in that particles are not formed in the water, volatile base and copolymer solution, and in that said dye remains associated with said copolymer in the subsequent dry state; and
   a second noncompatible, lightfast, copper phthalocyanine water-soluble blue dye in a wt. % range 2.25 to 3.0.

2. The ink composition of claim 1 including a third red tinting dye in a wt. % of about 0.25.

3. The ink composition of claims 1 or 2 wherein said compatible dye is an acid blue 83.

4. The ink composition of claims 1 or 2 wherein said compatible dye is an acid blue 83, and said noncompatible dye is a direct blue 86.

5. The ink composition of claims 1 or 2 wherein said compatible dye is an acid blue 83, and said noncompatible dye is a direct blue 86 presscake of wt. % range 0.5 to 1.

6. The ink composition of claim 2 wherein said compatible dye is present in a wt. % of about 2.5, wherein said noncompatible dye is present in a wt. % of about 2.25, and wherein said tinting dye is present in a wt. % of about 0.25.

7. The ink composition of claim 2 wherein said compatible dye is present in a wt. % of about 2.0, wherein said noncompatible dye is in presscake form and is present in a wt. % of about 0.5, and wherein said tinting dye is present in a wt. % of about 0.25.

8. The ink composition of claim 6 wherein said compatible dye is the brand Alizarine Cyanine Blue 6B, wherein said nocompatible dye is the brand Pyrazol Fast Turquoise FBL, and wherein said tinting dye is the brand Orasol Red 2B.

* * * * *